US012584881B2

(12) United States Patent
Shibutani et al.

(10) Patent No.: US 12,584,881 B2
(45) Date of Patent: Mar. 24, 2026

(54) SENSOR ELEMENT

(71) Applicant: NGK INSULATORS, LTD., Nagoya (JP)

(72) Inventors: Kaoru Shibutani, Nagoya (JP); Ryo Onishi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 134 days.

(21) Appl. No.: 18/282,046

(22) PCT Filed: Feb. 1, 2022

(86) PCT No.: PCT/JP2022/003768
§ 371 (c)(1),
(2) Date: Sep. 14, 2023

(87) PCT Pub. No.: WO2022/196140
PCT Pub. Date: Sep. 22, 2022

(65) Prior Publication Data
US 2024/0151685 A1 May 9, 2024

(30) Foreign Application Priority Data

Mar. 18, 2021 (JP) ................................ 2021-044221

(51) Int. Cl.
*G01N 27/407* (2006.01)
*G01M 15/10* (2006.01)
(Continued)

(52) U.S. Cl.
CPC ..... *G01N 27/4072* (2013.01); *G01N 27/4067* (2013.01); *G01N 27/4074* (2013.01);
(Continued)

(58) Field of Classification Search
CPC ........... G01N 27/4072; G01N 27/4067; G01N 27/4074; G01N 27/4077; G01N 27/41; G01M 15/102
See application file for complete search history.

(56) References Cited

U.S. PATENT DOCUMENTS

2011/0094883 A1* 4/2011 Ito ...................... G01N 27/4077
204/429
2016/0018357 A1 1/2016 Nishijima et al.
(Continued)

FOREIGN PATENT DOCUMENTS

CN 111751423 A 10/2020
CN 112445089 A 3/2021
(Continued)

OTHER PUBLICATIONS

Ide et al., JP2012093330A, English translation, 2012 (Year: 2012).*
(Continued)

*Primary Examiner* — Shizhi Qian
(74) *Attorney, Agent, or Firm* — MATTINGLY & MALUR, PC

(57) ABSTRACT

Provided is a sensor element for use in measurement of the concentration of a predetermined gas component in a measurement target gas. The sensor element includes a plate-shaped element body and a protective layer. The element body includes a solid electrolyte layer having oxygen ion conductivity and a heater configured to heat the solid electrolyte layer. A protective layer is formed on at least one face of the element body. A surface of the protective layer has a surface roughness Ra of 8 μm or less and a surface waviness Wa of 6 μm or more.

13 Claims, 7 Drawing Sheets

(51) Int. Cl.
    *G01N 27/406*     (2006.01)
    *G01N 27/41*     (2006.01)

(52) U.S. Cl.
    CPC ....... *G01N 27/4077* (2013.01); *G01M 15/102* (2013.01); *G01N 27/41* (2013.01)

(56) References Cited

U.S. PATENT DOCUMENTS

| | | | |
|---|---|---|---|
| 2017/0241942 A1* | 8/2017 | Chung | ............... G01N 27/4077 |
| 2017/0284958 A1* | 10/2017 | Watanabe | .......... G01N 27/4074 |
| 2018/0284055 A1 | 10/2018 | Hino | |
| 2020/0309730 A1 | 10/2020 | Hino et al. | |
| 2020/0309733 A1 | 10/2020 | Hino | |

FOREIGN PATENT DOCUMENTS

| | | | | |
|---|---|---|---|---|
| JP | 2002-249864 A | | 9/2002 | |
| JP | 2008-233165 A | | 10/2008 | |
| JP | 2009-080110 A | | 4/2009 | |
| JP | 2009-080111 A | | 4/2009 | |
| JP | 2012093330 A | * | 5/2012 | |
| JP | 2016-029360 A | | 3/2016 | |
| JP | 2016-065852 A | | 4/2016 | |
| JP | 2018-169324 A | | 11/2018 | |
| JP | 2020-165813 A | | 10/2020 | |
| JP | 2020-165816 A | | 10/2020 | |

OTHER PUBLICATIONS

Mitutoyo, Quick Guide to Precision Measuring Instruments, https://www2.mitutoyo.co.jp/eng/products/menu/QuickGuide_Surftest.Pdf, Nov. 22, 2010 (Year: 2010).*
International Search Report of PCT/JP2022/003768 dated Apr. 16, 2022.
Written Opinion of the International Searching Authority of PCT/JP2022/003768 dated Apr. 16, 2022.
Chinese Office Action received in corresponding Chinese Application No. 202280014569.6 dated Dec. 31, 2025.

\* cited by examiner

Up
Front ← → Rear
Down

Short side direction

Up

Left ←——→ Right

Down

SENSOR ELEMENT

TECHNICAL FIELD

The present invention relates to a sensor element, and particularly relates to a sensor element used to measure the concentration of a predetermined gas component in a measurement target gas.

BACKGROUND ART

JP 2016-65852A (Patent Document 1) discloses a gas sensor configured to measure the concentration of a predetermined gas component in a measurement target gas. This gas sensor includes a sensor element. In this gas sensor, a protective film is formed on the front end portion of the sensor element in order to suppress thermal shock caused by the sensor element being exposed to water (see Patent Document 1).

CITATION LIST

Patent Literature

Patent Literature 1: JP 2016-65852A

SUMMARY OF INVENTION

Technical Problem

A gas sensor that includes a sensor element is attached to an engine exhaust pipe, for example. In recent years, there has been demand to activate the gas sensor quickly after starting the engine. In other words, there is demand to make the temperature rise timing of the sensor element earlier after the engine is started.

Condensate water is sometimes present in the exhaust pipe immediately after the engine is started. If the temperature rise timing of the sensor element is made earlier after the engine is started, condensate water may come into contact with the heated sensor element. If condensate water comes into contact with the heated sensor element, thermal shock occurs in the sensor element. This thermal shock can cause the formation of a crack in the sensor element. Such a problem possibly cannot be resolved even with the sensor element disclosed in Patent Document 1.

An object of the present invention is to provide a sensor element that is less susceptible to thermal shock caused by exposure to water.

Solution to Problem

A sensor element according to the present invention is for use in measurement of the concentration of a predetermined gas component in a measurement target gas. The sensor element includes a plate-shaped element body and a protective layer. The element body includes a solid electrolyte layer having oxygen ion conductivity and a heater configured to heat the solid electrolyte layer. A protective layer is formed on at least one face of the element body. A surface of the protective layer has a surface roughness Ra of 8 μm or less and a surface waviness Wa of 6 μm or more.

In this sensor element, the surface of the protective layer has a relatively small surface roughness Ra and a relatively large surface waviness Wa. Therefore, it is unlikely for moisture dropped on the surface of the protective layer to remain in one place. As a result, according to this sensor element, there is a high possibility that moisture that has dripped onto the surface of the protective layer will move to a portion other than the sensor element, thus making it possible to suppress thermal shock caused by exposure to water.

In the sensor element, a configuration is possible in which the element body has a long side and a short side in plan view, and the surface roughness Ra and the surface waviness Wa are each obtained from a profile curve of the protective layer in a short side direction.

In the sensor element, a configuration is possible in which a position corresponding to a central portion of the protective layer in a short side direction of the element body is raised higher than positions corresponding to two end portions of the protective layer in the short side direction.

Therefore, according to this sensor element, there is a high possibility that moisture that has dripped onto the surface of the protective layer will flow toward either of the two end portions of the protective layer and move to an area other than the sensor element, thus making it possible to suppress thermal shock caused by exposure to water.

In the sensor element, a configuration is possible in which the protective layer includes an inner protective layer and an outer protective layer located outward of the inner protective layer, the inner protective layer and the outer protective layer are each porous, an average pore diameter of the outer protective layer is smaller than an average pore diameter of the inner protective layer, and a porosity of the inner protective layer is 40% or more and 60% or less.

In the sensor element, a configuration is possible in which a film thickness of the inner protective layer is 170 μm or more and 900 μm or less.

In the sensor element, a configuration is possible in which a porosity of the outer protective layer is 15% or more and 50% or less.

In the sensor element, a configuration is possible in which a film thickness of the outer protective layer is 30 μm or more and 300 μm or less.

Advantageous Effects of Invention

According to the present invention, it is possible to provide a sensor element that is less susceptible to thermal shock caused by exposure to water.

DESCRIPTION OF EMBODIMENTS

Figure 1:
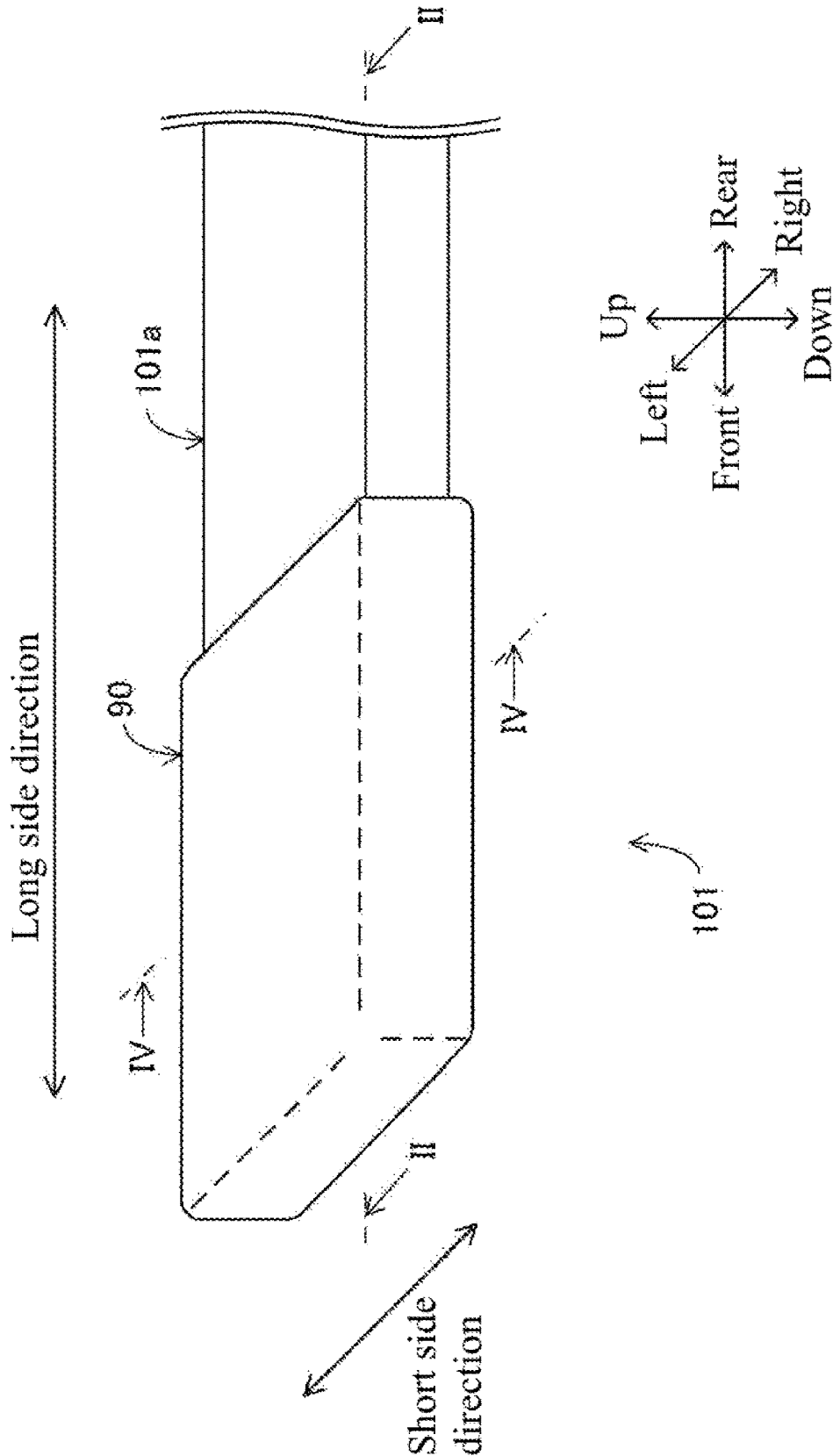
FIG. 1 is a perspective view schematically showing an example of a sensor element.

Hereinafter, an embodiment of the present invention will be described in detail with reference to the drawings. Note that like or corresponding constituent elements in the drawings are denoted by the same reference numerals, and repeated descriptions will not be given for such constituent elements.

1. Schematic Configuration of Sensor Element

Figure 2:
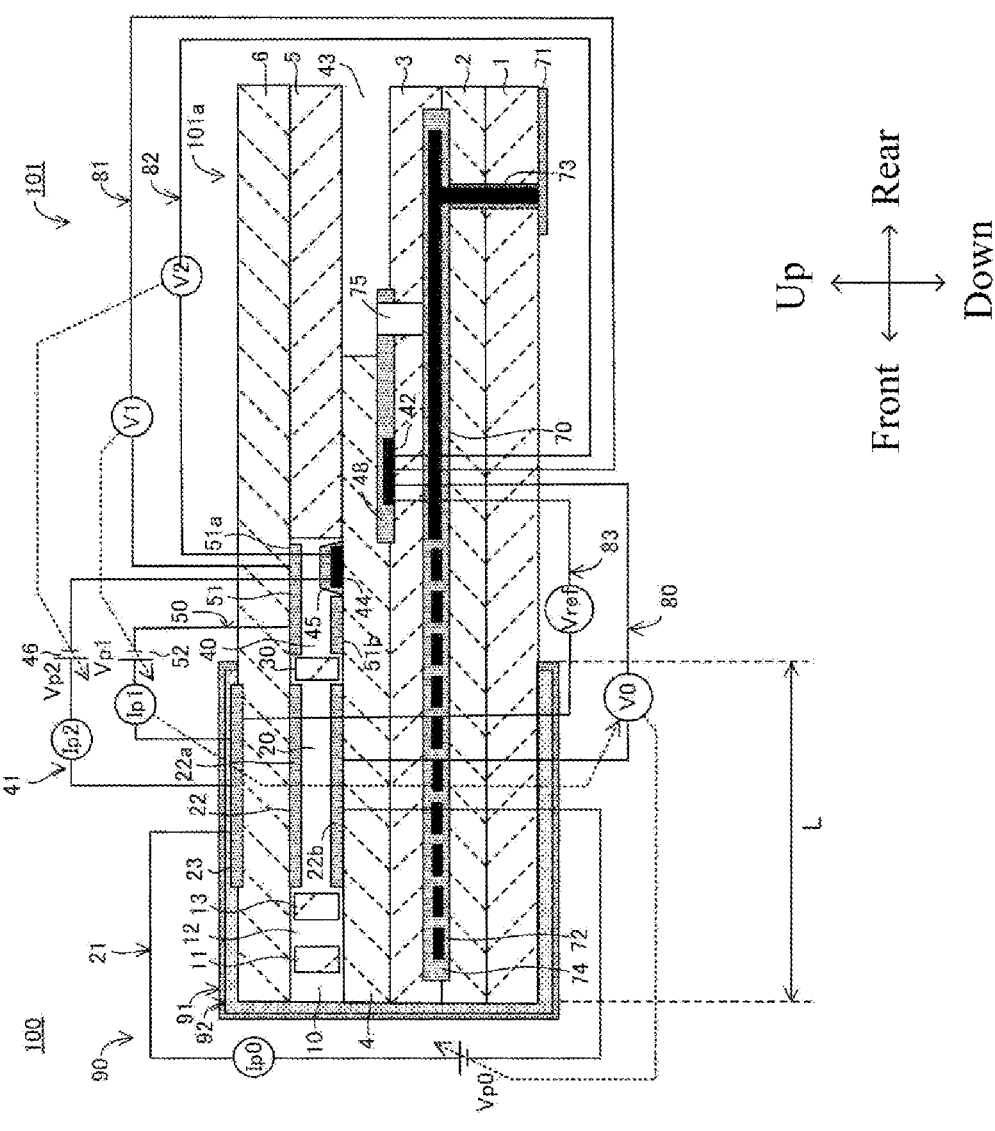
FIG. 2 is a cross-sectional schematic diagram schematically showing an example of a configuration of the gas sensor.

FIG. 1 is a perspective view schematically showing an example of a sensor element 101 according to the present embodiment. FIG. 2 is a cross-sectional schematic diagram schematically showing an example of the configuration of a gas sensor 100 that includes the sensor element 101. In FIG. 2, the cross-section of the sensor element 101 corresponds to a cross-section taken along II-II in FIG. 1. Note that the sensor element 101 is shaped as an elongated rectangular parallelepiped. The sensor element 101 has long sides and short sides in plan view. In the following, the long side direction of the sensor element 101 (left-right direction in FIG. 2) may also be referred to as the front-rear direction, and the thickness direction of the sensor element 101 (up-down direction in FIG. 2) may also be referred to as the up-down direction. Also, the short side direction of the sensor element 101 (the direction perpendicular to the front-rear direction and the up-down direction) may also be referred to as the left-right direction.

As show in FIGS. 1 and 2, the gas sensor 100 is for attachment to the exhaust pipe of a vehicle, for example, and is configured to measure the concentration of a measurement target gas, which is a specific gas such as NOx or O$_2$ contained in exhaust gas. In the present embodiment, the gas sensor 100 measures the NOx concentration as the specific gas concentration. The sensor element 101 includes an element body 101a and a protective layer 90 that covers the element body 101a. Note that the element body 101a is a portion of the sensor element 101 other than the protective layer 90.

The sensor element 101 is an element having a structure in which six layers consisting of a first substrate layer 1, a second substrate layer 2, a third substrate layer 3, a first solid electrolyte layer 4, a spacer layer 5, and a second solid electrolyte layer 6 are stacked in this order from the lower side in the drawing, the layers being each constituted by an oxygen ion-conductive solid electrolyte layer made of zirconia (ZrO2) or the like. Furthermore, the solid electrolyte forming these six layers is a dense and airtight material. The sensor element 101 with this configuration is produced, for example, by performing predetermined processing and printing of circuit patterns on ceramic green sheets corresponding to the respective layers, stacking the resultant layers, and integrating them through firing.

In the front end portion of the sensor element 101, a gas introduction opening 10, a first diffusion control unit 11, a buffer space 12, a second diffusion control unit 13, a first internal cavity 20, a third diffusion control unit 30, and a second internal cavity 40 are arranged in this order adjacent to each other in a connected manner between the lower face of the second solid electrolyte layer 6 and the upper face of the first solid electrolyte layer 4.

The gas introduction opening 10, the buffer space 12, the first internal cavity 20, and the second internal cavity are spaces inside the sensor element 101, the spaces being each formed by cutting out the spacer layer 5, and each having an upper portion defined by the lower face of the second solid electrolyte layer 6, a lower portion defined by the upper face of the first solid electrolyte layer 4, and side portions defined by the side faces of the spacer layer 5.

The first diffusion control unit 11, the second diffusion control unit 13, and the third diffusion control unit 30 are each provided as two slits that are laterally elongated (have openings whose lengthwise direction is perpendicular to the diagram). Note that the region extending from the gas introduction opening 10 to the second internal cavity 40 is also referred to as a gas flow passage.

Furthermore, a reference gas introduction space 43 having side portions defined by the side faces of the first solid electrolyte layer 4 is provided between the upper face of the third substrate layer 3 and the lower face of the spacer layer 5, at a position that is farther from the front side than the gas flow passage is. For example, air is introduced into the reference gas introduction space 43. It is also possible that the first solid electrolyte layer 4 extends to the rear end of the sensor element 101, and the reference gas introduction space 43 is not formed. Furthermore, if the reference gas introduction space 43 is not formed, an air introduction layer 48 may extend to the rear end of the sensor element 101 (see FIG. 5, for example).

The air introduction layer 48 is a layer made of porous alumina, and reference gas is introduced into the air introduction layer 48 via the reference gas introduction space 43. Furthermore, the air introduction layer 48 is formed so as to cover a reference electrode 42.

The reference electrode 42 is an electrode formed so as to be held between the upper face of the third substrate layer 3 and the first solid electrolyte layer 4, and, as described above, is covered by the air introduction layer 48 that is continuous with the reference gas introduction space 43. Furthermore, as will be described later, it is possible to measure the oxygen concentration (oxygen partial pressure) in the first internal cavity 20 or the second internal cavity 40, using the reference electrode 42.

In the gas flow passage, the gas introduction opening 10 is a region that is open to the external space, and a measurement target gas is introduced from the external space via the gas introduction opening 10 into the sensor element 101.

The first diffusion control unit 11 is a region that applies a predetermined diffusion resistance to the measurement target gas introduced from the gas introduction opening 10.

The buffer space 12 is a space that is provided in order to guide the measurement target gas introduced from the first diffusion control unit 11 to the second diffusion control unit 13.

The second diffusion control unit 13 is a region that applies a predetermined diffusion resistance to the measurement target gas introduced from the buffer space 12 into the first internal cavity 20.

When the measurement target gas is introduced from the outside of the sensor element 101 into the first internal cavity 20, the measurement target gas abruptly introduced from the gas introduction opening 10 into the sensor element 101 due to a change in the pressure of the measurement target gas in the external space (a pulsation of the exhaust pressure in the case in which the measurement target gas is exhaust gas of an automobile) is not directly introduced into the first internal cavity 20, but is introduced into the first internal cavity 20 after passing through the first diffusion control unit 11, the buffer space 12, and the second diffusion control unit 13 where a change in the concentration of the measurement target gas is canceled. Accordingly, a change in the concentration of the measurement target gas introduced into the first internal cavity 20 is reduced to be almost negligible.

The first internal cavity 20 is provided as a space for adjusting the oxygen partial pressure in the measurement target gas introduced via the second diffusion control unit

5

13. The oxygen partial pressure is adjusted through an operation of a main pump cell 21.

The main pump cell 21 is an electro-chemical pump cell constituted by an internal pump electrode 22 having a ceiling electrode portion 22a provided over substantially the entire lower face of the second solid electrolyte layer 6 that faces the first internal cavity 20, an external pump electrode 23 provided so as to be exposed to the external space in the region corresponding to the ceiling electrode portion 22a on the upper face of the second solid electrolyte layer 6, and the second solid electrolyte layer 6 held between these electrodes.

The internal pump electrode 22 is formed across upper and lower solid electrolyte layers (the second solid electrolyte layer 6 and the first solid electrolyte layer 4) that define the first internal cavity 20, and the spacer layer 5 that forms side walls. Specifically, the ceiling electrode portion 22a is formed on the lower face of the second solid electrolyte layer 6 that forms the ceiling face of the first internal cavity 20, a bottom electrode portion 22b is formed on the upper face of the first solid electrolyte layer 4 that forms the bottom face, and side electrode portions (not shown) that connect the ceiling electrode portion 22a and the bottom electrode portion 22b are formed on side wall faces (inner faces) of the spacer layer 5 that form two side wall portions of the first internal cavity 20, so that the entire structure is arranged in the form of a tunnel at the region in which the side electrode portions are arranged.

The internal pump electrode 22 and the external pump electrode 23 are formed as porous cermet electrodes (e.g., cermet electrodes of $ZrO_2$ and Pt containing 1% of Au). Note that the internal pump electrode 22 with which the measurement target gas is brought into contact is made of a material that has a lowered capability of reducing a NOx component in the measurement target gas.

The main pump cell 21 can apply a desired pump voltage Vp0 between the internal pump electrode 22 and the external pump electrode 23, thereby causing a pump current Ip0 to flow in the positive direction or the negative direction between the internal pump electrode 22 and the external pump electrode 23, so that oxygen in the first internal cavity 20 is pumped out to the external space or oxygen in the external space is pumped into the first internal cavity 20.

Furthermore, in order to detect the oxygen concentration (oxygen partial pressure) in the atmosphere in the first internal cavity 20, the internal pump electrode 22, the second solid electrolyte layer 6, the spacer layer 5, the first solid electrolyte layer 4, the third substrate layer 3, and the reference electrode 42 constitute an electro-chemical sensor cell, that is, a main pump-controlling oxygen partial pressure detection sensor cell 80.

It is possible to see the oxygen concentration (oxygen partial pressure) in the first internal cavity 20 by measuring an electromotive force V0 in the main pump-controlling oxygen partial pressure detection sensor cell 80. Furthermore, the pump current Ip0 is controlled by performing feedback control on Vp0 such that the electromotive force V0 is kept constant. Accordingly, the oxygen concentration in the first internal cavity 20 can be kept at a predetermined constant value.

The third diffusion control unit 30 is a region that applies a predetermined diffusion resistance to the measurement target gas whose oxygen concentration (oxygen partial pressure) has been controlled through an operation of the main pump cell 21 in the first internal cavity 20, thereby guiding the measurement target gas to the second internal cavity 40.

The second internal cavity 40 is provided as a space for performing processing regarding measurement of the concentration of nitrogen oxide (NOx) in the measurement target gas introduced via the third diffusion control unit 30. The NOx concentration is measured mainly in the second internal cavity 40 whose oxygen concentration has been adjusted by an auxiliary pump cell 50, through an operation of a measurement pump cell 41.

In the second internal cavity 40, the measurement target gas subjected to adjustment of the oxygen concentration (oxygen partial pressure) in advance in the first internal cavity 20 and then introduced via the third diffusion control unit is further subjected to adjustment of the oxygen partial pressure by the auxiliary pump cell 50. Accordingly, the oxygen concentration in the second internal cavity 40 can be precisely kept at a constant value, and thus the gas sensor 100 can measure the NOx concentration with a high level of precision.

The auxiliary pump cell 50 is an auxiliary electro-chemical pump cell constituted by an auxiliary pump electrode 51 having a ceiling electrode portion 51a provided on substantially the entire lower face of the second solid electrolyte layer 6 that faces the second internal cavity 40, the external pump electrode 23 (which is not limited to the external pump electrode 23, and may be any appropriate electrode outside the sensor element 101), and the second solid electrolyte layer 6.

The auxiliary pump electrode 51 with this configuration is arranged inside the second internal cavity 40 in the form of a tunnel as with the above-described internal pump electrode 22 arranged inside the first internal cavity 20. That is to say, the ceiling electrode portion 51a is formed on the second solid electrolyte layer 6 that forms the ceiling face of the second internal cavity 40, a bottom electrode portion 51b is formed on the first solid electrolyte layer 4 that forms the bottom face of the second internal cavity 40, and side electrode portions (not shown) that connect the ceiling electrode portion 51a and the bottom electrode portion 51b are formed on two wall faces of the spacer layer 5 that form side walls of the second internal cavity 40, so that the entire structure is arranged in the form of a tunnel.

Note that the auxiliary pump electrode 51 is also made of a material that has a lowered capability of reducing a NOx component in the measurement target gas, as with the internal pump electrode 22.

The auxiliary pump cell 50 can apply a desired voltage Vp1 between the auxiliary pump electrode 51 and the external pump electrode 23, so that oxygen in the atmosphere in the second internal cavity 40 is pumped out to the external space or oxygen in the external space is pumped into the second internal cavity 40.

Furthermore, in order to control the oxygen partial pressure in the atmosphere in the second internal cavity 40, the auxiliary pump electrode 51, the reference electrode 42, the second solid electrolyte layer 6, the spacer layer 5, the first solid electrolyte layer 4, and the third substrate layer 3 constitute an electro-chemical sensor cell, that is, an auxiliary pump-controlling oxygen partial pressure detection sensor cell 81.

Note that the auxiliary pump cell 50 performs pumping using a variable power source 52 whose voltage is controlled based on an electromotive force V1 detected by the auxiliary pump-controlling oxygen partial pressure detection sensor cell 81. Accordingly, the oxygen partial pressure in the atmosphere in the second internal cavity 40 is controlled to be a partial pressure that is low enough to not substantially affect the NOx measurement.

Furthermore, a pump current Ip1 is used to control the electromotive force of the main pump-controlling oxygen partial pressure detection sensor cell 80. Specifically, the pump current Ip1 is input as a control signal to the main pump-controlling oxygen partial pressure detection sensor cell 80, and the electromotive force V0 is controlled such that a gradient of the oxygen partial pressure in the measurement target gas that is introduced from the third diffusion control unit 30 into the second internal cavity 40 is always kept constant. When the sensor is used as an NOx sensor, the oxygen concentration in the second internal cavity 40 is kept at a constant value that is about 0.001 ppm through an operation of the main pump cell 21 and the auxiliary pump cell 50.

The measurement pump cell 41 measures the NOx concentration in the measurement target gas, in the second internal cavity 40. The measurement pump cell 41 is an electro-chemical pump cell constituted by a measurement electrode 44 spaced away from the third diffusion control unit 30, on the upper face of the first solid electrolyte layer 4 that faces the second internal cavity 40, the external pump electrode 23, the second solid electrolyte layer 6, the spacer layer 5, and the first solid electrolyte layer 4.

The measurement electrode 44 is a porous cermet electrode. The measurement electrode 44 functions also as an NOx reduction catalyst for reducing NOx that is present in the atmosphere in the second internal cavity 40. Furthermore, the measurement electrode 44 is covered by a fourth diffusion control unit 45.

The fourth diffusion control unit 45 is a membrane constituted by a porous member mainly made of alumina ($Al_2O_3$). The fourth diffusion control unit 45 serves to limit the amount of NOx flowing into the measurement electrode 44, and also functions as a protective film of the measurement electrode 44.

The measurement pump cell 41 can pump out oxygen generated through the decomposition of nitrogen oxide in the atmosphere around the measurement electrode 44, and detect the generated amount as a pump current Ip2.

Furthermore, in order to detect the oxygen partial pressure around the measurement electrode 44, the second solid electrolyte layer 6, the spacer layer 5, the first solid electrolyte layer 4, the third substrate layer 3, the measurement electrode 44, and the reference electrode 42 constitute an electro-chemical sensor cell, that is, a measurement pump-controlling oxygen partial pressure detection sensor cell 82. A variable power source 46 is controlled based on an electromotive force V2 detected by the measurement pump-controlling oxygen partial pressure detection sensor cell 82.

The measurement target gas guided into the second internal cavity 40 passes through the fourth diffusion control unit 45 and reaches the measurement electrode 44 in a state in which the oxygen partial pressure is controlled. Nitrogen oxide in the measurement target gas around the measurement electrode 44 is reduced to generate oxygen ($2NO->N_2+O_2$). The generated oxygen is pumped by the measurement pump cell 41, and, at that time, a voltage Vp2 of the variable power source is controlled such that a control voltage V2 detected by the measurement pump-controlling oxygen partial pressure detection sensor cell 82 is kept constant. The amount of oxygen generated around the measurement electrode 44 is proportional to the concentration of nitrogen oxide in the measurement target gas, and thus it is possible to calculate the concentration of nitrogen oxide in the measurement target gas, using the pump current Ip2 in the measurement pump cell 41.

Furthermore, if the measurement electrode 44, the first solid electrolyte layer 4, the third substrate layer 3, and the reference electrode 42 are combined to constitute an oxygen partial pressure detection means as an electro-chemical sensor cell, it is possible to detect an electromotive force that corresponds to a difference between the amount of oxygen generated through reduction of a NOx component in the atmosphere around the measurement electrode 44 and the amount of oxygen contained in reference air can be detected, and thus it is also possible to obtain the concentration of the NOx component in the measurement target gas.

Furthermore, the second solid electrolyte layer 6, the spacer layer 5, the first solid electrolyte layer 4, the third substrate layer 3, the external pump electrode 23, and the reference electrode 42 constitute an electro-chemical sensor cell 83, and it is possible to detect the oxygen partial pressure in the measurement target gas outside the sensor, based on an electromotive force Vref obtained by the sensor cell 83.

In the gas sensor 100 with this configuration, when the main pump cell 21 and the auxiliary pump cell 50 operate, the measurement target gas whose oxygen partial pressure is always kept at a constant low value (a value that does not substantially affect the NOx measurement) is supplied to the measurement pump cell 41. Accordingly, it is possible to see the NOx concentration in the measurement target gas, based on the pump current Ip2 that flows when oxygen generated through reduction of NOx is pumped out by the measurement pump cell 41, substantially in proportion to the concentration of NOx in the measurement target gas.

Furthermore, in order to improve the oxygen ion conductivity of the solid electrolyte, the sensor element 101 includes a heater unit 70 that serves to adjust the temperature of the sensor element 101 through heating and heat retention. The heater unit 70 includes a heater electrode 71, a heater 72, a through-hole 73, a heater insulating layer 74, and a pressure dispersing hole 75.

The heater electrode 71 is an electrode formed so as to be in contact with the lower face of the first substrate layer 1. When the heater electrode 71 is connected to an external power source, electricity can be supplied to the heater unit 70 from the outside.

The heater 72 is an electrical resistor formed so as to be held between the second substrate layer 2 and the third substrate layer 3 from above and below. The heater 72 is connected via the through-hole 73 to the heater electrode 71, and, when electricity is supplied from the outside via the heater electrode 71, the heater 72 generates heat, thereby heating and keeping the temperature of a solid electrolyte constituting the sensor element 101.

Furthermore, the heater 72 is embedded over the entire region from the first internal cavity 20 to the second internal cavity 40, and thus the entire sensor element 101 can be adjusted to a temperature at which the above-described solid electrolyte is activated.

The heater insulating layer 74 is an insulating layer constituted by an insulating member made of alumina or the like on the upper and lower faces of the heater 72. The heater insulating layer 74 is formed in order to realize electrical insulation between the second substrate layer 2 and the heater 72 and electrical insulation between the third substrate layer 3 and the heater 72.

The pressure dispersing hole 75 is a hole that extends through the third substrate layer 3 and is connected to the reference gas introduction space 43, and is formed in order to alleviate an increase in the internal pressure in accordance with an increase in the temperature in the heater insulating layer 74.

As described above, a portion of the element body 101a is covered by the protective layer 90. The protective layer 90 covers five of the six surfaces of the element body 101a. More specifically, the protective layer 90 covers the upper face, the lower face, the left face, the right face, and the front face of the element body 101a.

The protective layer 90 is made of a porous material, such as a ceramic containing ceramic particles. The ceramic particles are particles of a metal oxide such as alumina ($Al_2O_3$), zirconia ($ZrO_2$), spinel ($MgAl_2O_4$), or mullite ($Al_6O_{13}Si_2$), and it is preferable that the protective layer 90 includes at least one of such materials. Note that in the present embodiment, the protective layer 90 is made of an alumina porous material.

The protective layer 90 covers the entirety of a region of the surface of the element body 101a extending a distance L (see FIG. 2) rearward from the front end face of the element body 101a. Also, the protective layer 90 covers the portion where the external pump electrode 23 is formed. The protective layer 90 covers the gas introduction opening 10, but since the protective layer 90 is made of a porous material, the measurement target gas can flow through the protective layer 90 and reach the gas introduction opening 10. The protective layer 90 covers a portion of the element body 101a (a portion including the front end face of the element body 101a and extending the distance L from the front end face), and protects that portion. The protective layer 90 prevents cracking of the element body 101a caused by moisture in the measurement target gas coming into contact with the element body 101a, for example. Note that the distance L is determined based on the range of the element body 101a that is exposed to the measurement target gas in the gas sensor 100, the position of the external pump electrode 23, and the like (0<distance L<length of element body 101a in long side direction).

The protective layer 90 has a two-layer structure. The protective layer 90 includes a porous outer protective layer 91 and a porous inner protective layer 92. The inner protective layer 92 covers a portion of the surface of the element body 101a. The outer protective layer 91 is positioned outward of the inner protective layer 92 relative to the element body 101a, and is laminated on the inner protective layer 92. The outer protective layer 91 has a smaller average pore diameter than the inner protective layer 92. Specifically, the ratio R1/R2 between an average pore diameter R1 μm of the outer protective layer 91 and an average pore diameter R2 μm of the inner protective layer 92 is less than 1.0.

A thickness Th1 of the outer protective layer 91 may be 30 μm or more, or 50 μm or more, and 300 μm or less, 200 μm or less, 150 μm or less, or 100 μm or less. Note that the thickness Th1 does not necessarily need to be uniform throughout the entirety of the outer protective layer 91.

A thickness Th2 of the inner protective layer 92 may be 170 μm or more, 200 μm or more, or 250 μm or more, and 900 μm or less, or 400 μm or less. Note that the thickness Th2 does not necessarily need to be uniform throughout the entirety of the inner protective layer 92.

In the present embodiment, the thickness Th1 of the outer protective layer 91 and the thickness Th2 of the inner protective layer 92 are each a value derived as follows. First, the sensor element 101 is cut along the thickness direction of the outer protective layer 91. An observation sample is prepared by filling the cut surface with resin and polishing the cut surface. Subsequently, the magnification of an SEM (Scanning Electron Microscope) is set to 1000 times, and the observation surface of the observation sample (the cross section of the outer protective layer 91) is photographed. An SEM image of the outer protective layer 91 is thus obtained. The obtained SEM image is used to identify the boundary between the outer protective layer 91 (e.g., the portion located above the second solid electrolyte layer 6) and the inner protective layer 92 (e.g., the portion located above the second solid electrolyte layer 6). Also, the direction perpendicular to the surface of the element body 101a on which protective layer 90 is formed (e.g., the upper face of the second solid electrolyte layer 6) is specified as the thickness direction. Then, the distance in the thickness direction from the surface (here, the upper face) of the protective layer 90 to the boundary is derived as the thickness Th1. Also, the distance in the thickness direction from the surface of the element body 101a to the boundary is derived as the thickness Th2. Note that the SEM image can be acquired using SU1510 manufactured by Hitachi High-Technologies Corporation, for example.

It is preferable that the outer protective layer 91 has a porosity Po1 of 30% or more. When the porosity Po1 is 30% or more, the pore volume in the outer protective layer 91 is less likely to be insufficient with respect to the water content, and the outer protective layer 91 can sufficiently retain water. Also, it is preferable that the porosity Po1 of the outer protective layer 91 is 50% or less. When the porosity Po1 is 50% or less, it is unlikely for water to pass through the outer protective layer 91, and the outer protective layer 91 can sufficiently retain water.

Also, it is preferable that the inner protective layer 92 has a porosity Po2 of 40% or more. When the porosity Po2 is 40% or more, it is possible to suppress insufficiency of the heat insulation effect of the inner protective layer 92 between the outer protective layer 91 and the element body 101a. Also, it is preferable that the inner protective layer 92 has a porosity Po2 of 60% or less. When the porosity Po2 is 60% or less, it is possible to suppress insufficiency of the strength of the inner protective layer 92.

In the present embodiment, the porosity Po1 of the outer protective layer 91 is a value derived as follows. First, the sensor element 101 is cut along the thickness direction of the outer protective layer 91. An observation sample is prepared by filling the cut surface with resin and polishing the cut surface. Subsequently, the magnification of the SEM is set to 100 times, and the observation surface of the observation sample (the cross section of the outer protective layer 91) is photographed. An SEM image of the outer protective layer 91 is thus obtained. The obtained SEM image is then subjected to image analysis. A threshold value is determined by discriminant analysis based on the luminance distribution of the pixels in the image. After that, the pixels of the image are binarized into object portion pixels and pore portion pixels based on the determined threshold value, and the area of the object portion and the area of the pore portion are calculated. Then, the ratio of the area of the pore portion to the total area (the total area of the object portion and the pore portion) is derived as the porosity Po1. The porosity Po2 of the inner protective layer 92 is a value derived in a similar manner.

2. Issues in Early Activation of Gas Sensor

The gas sensor 100 is attached to the exhaust pipe of a vehicle engine, for example. In recent years, there has been demand for earlier activation of the gas sensor 100 after engine start-up. In other words, there is demand to make the temperature rise timing of the sensor element 101 earlier after the engine is started.

Figure 3:
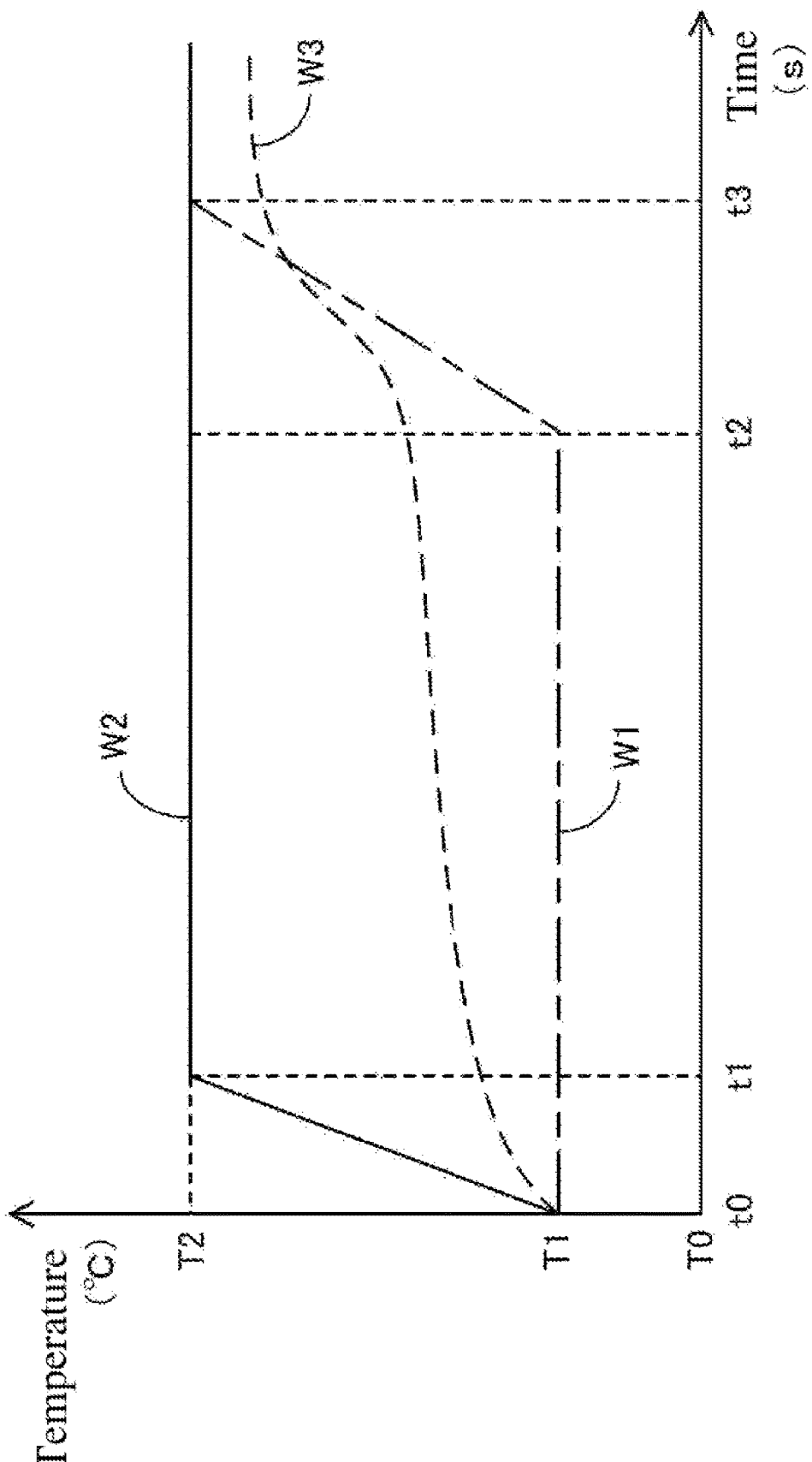
FIG. 3 is a diagram showing an example of how the temperature of a sensor element and the like changes.

FIG. 3 is a diagram showing an example of how the temperature of the sensor element 101 and the like changes. In FIG. 3, the horizontal axis indicates time, and the vertical axis indicates temperature. A line W2 indicates an example of temperature change of the sensor element 101, and a line W1 indicates an example of temperature change of a sensor element for comparison. A line W3 shows an example of temperature change of exhaust gas passing through the exhaust pipe of the engine.

At time t0, the engine starts. At time t0, condensate water is present in the exhaust pipe. After starting the engine, the condensate water disperses in the exhaust pipe and enters the gas sensor 100. As the temperature of the exhaust gas rises, the inside of the gas sensor 100 becomes dry at time t2, for example.

After the inside of the gas sensor 100 becomes dry (time t2), the temperature of the sensor element for comparison starts to rise. Thereafter, the temperature of the sensor element for comparison reaches a temperature T2 at time t3. The temperature T2 is the temperature required for the gas sensor to function. Since the temperature of the sensor element for comparison starts rising after the inside of the gas sensor 100 becomes dry, the possibility of cracks forming in the sensor element for comparison is low. However, the sensor element for comparison cannot function until time t3.

On the other hand, the temperature of the sensor element 101 starts rising at the same time as the engine is started (time t0), for example. The temperature of sensor element 101 reaches a temperature T2 at time t1. In other words, the temperature rise timing of the sensor element 101 is earlier than the temperature rise timing of the sensor element for comparison.

If the temperature rise of the sensor element 101 is started at time t0, condensate water may come into contact with the heated sensor element 101. If the temperature rise of a sensor element that has not undergone any particular structural modification is started at time t0, a crack may form in the sensor element due to thermal stress caused by condensate water coming into contact with the sensor element.

In the gas sensor 100 according to the present embodiment, an innovation has been made to the structure of the sensor element 101. As a result, a crack is less likely to form in the sensor element 101 even if the gas sensor 100 is activated earlier after the engine is started. An innovation made in the structure of the sensor element 101 will be described in detail below.

3. Characteristic Structure in Sensor Element

Figure 4:
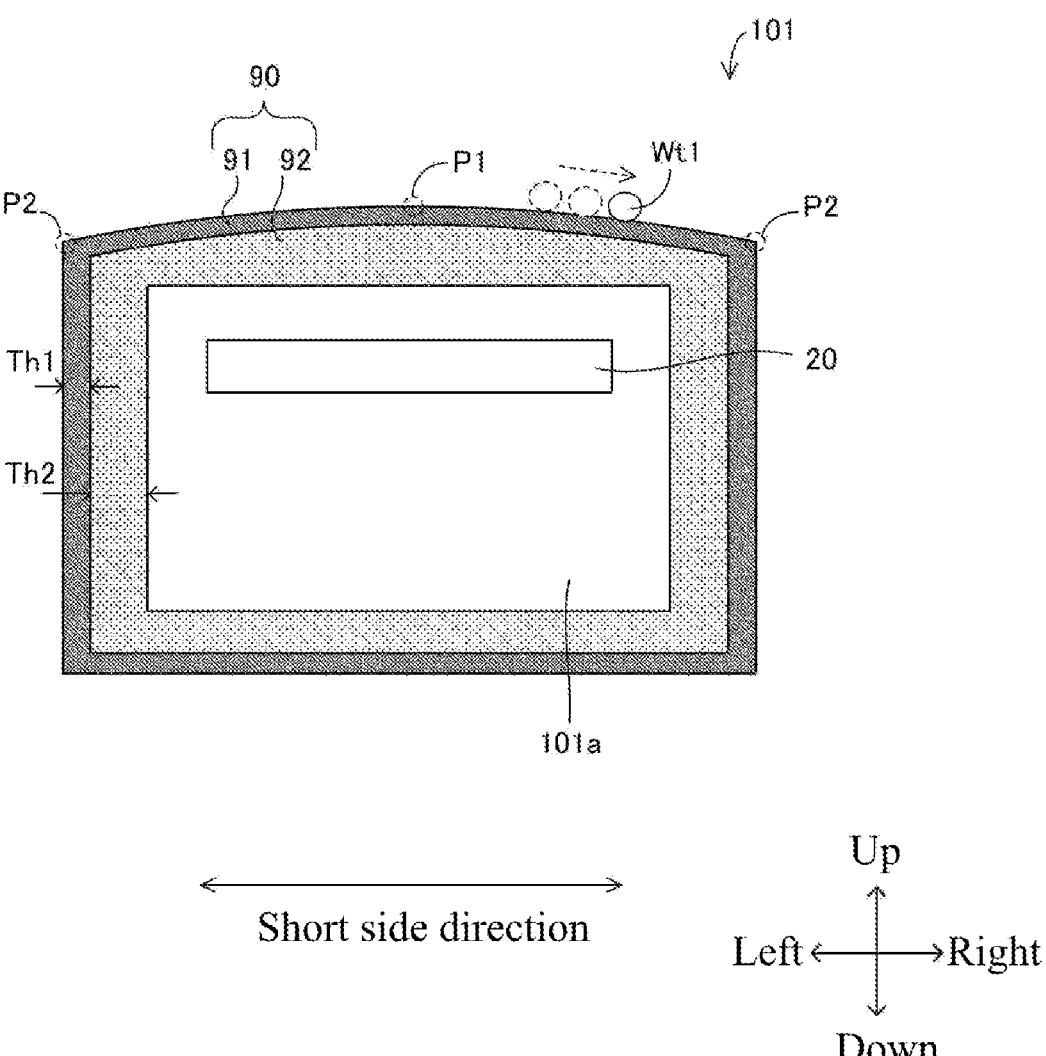
FIG. 4 is a diagram schematically showing a cross-section taken along IV-IV in FIG. 1.

FIG. 4 is a diagram schematically showing a cross-section taken along IV-IV in FIG. 1. Note that the structure of the element body 101*a* is simplified in FIG. 4. As shown in FIG. 4, in the sensor element 101, an innovation has been made in the structure of the upper face of the protective layer 90. Specifically, with respect to the short side direction of the sensor element 101, the surface roughness Ra of the upper face of the protective layer 90 is 8 μm or less, and the surface waviness Wa of the upper face of the protective layer 90 is 6 μm or more. It is preferable that the surface roughness Ra of the upper face of the protective layer 90 is 7.6 μm or less, and the surface waviness Wa of the upper face of the protective layer 90 is 6.9 μm or more. Note that the surface roughness Ra and the surface waviness Wa are defined in accordance with JIS B0633:2001. In other words, the surface roughness Ra means the arithmetic average height of a roughness curve, and the surface waviness Wa means the arithmetic average height of a waviness curve. The roughness curve and the waviness curve are each obtained from a profile curve of the protective layer 90 in the short side direction.

Specifically, in the sensor element 101, the upper face of the protective layer 90 has a relatively small surface roughness Ra and a relatively large surface waviness Wa. Accordingly, a water droplet Wt1 dropped on the upper face of the protective layer 90 is greatly affected by the Leidenfrost phenomenon, and is not likely to stay in one place on the upper face of the protective layer 90. As a result, with the sensor element 101, there is a high possibility that the water droplet Wt1 that has dropped onto the upper face of the protective layer 90 will move to a portion other than the sensor element 101, thus suppressing thermal shock caused by exposure to water.

More specifically, on the upper face of the protective layer 90, a position P1 corresponding to the central portion of the protective layer 90 in the short side direction is raised higher than positions P2 corresponding to the two end portions of the protective layer 90 in the short side direction. Therefore, according to the sensor element 101, the water droplet Wt1 dropped on the upper face of the protective layer 90 is greatly affected by the Leidenfrost phenomenon, and is highly likely to flow toward either of the end portions of the protective layer 90 in the short side direction and move to a portion other than the sensor element 101, thus making it possible to suppress thermal shock caused by exposure to water.

Note that in FIG. 4, the position in the up-down direction gradually descends from the position P1 toward the positions P2, and although the positions P2 are lower than the position P1, there may also be portions where the position in the up-down direction rises from the position P1 toward the positions P2. Also, in the region between the position P1 and each of the positions P2, there may be a region located higher than the position P1 in the up-down direction.

4. Features

As described above, in the sensor element 101 according to the present embodiment, the surface of the protective layer 90 has a surface roughness Ra of 8 μm or less and a surface waviness Wa of 6 μm or more. In other words, the surface of the protective layer 90 has a relatively small surface roughness Ra and a relatively large surface waviness Wa. Therefore, it is unlikely for moisture dropped on the surface of the protective layer 90 to remain in one place. As a result, according to the sensor element 101, there is a high possibility that moisture that has dropped onto the surface of the protective layer 90 will move to a portion other than the sensor element 101, thus making it possible to suppress thermal shock caused by exposure to water.

5. Modified Examples

Although an embodiment of the present invention has been described above, the present invention is not limited to the foregoing embodiment, and various modifications can be made within the scope not departing from the gist of the invention. Hereinafter, modified examples will be described.

5-1

In the sensor element 101 according to the foregoing embodiment, the first internal cavity 20 and the second internal cavity 40 are formed in the sensor element 101. That is to say, the sensor element 101 has a two-cavity structure. However, the sensor element 101 does not necessarily need to have a two-cavity structure. For example, the sensor element 101 may have a three-cavity structure.

Figure 5:
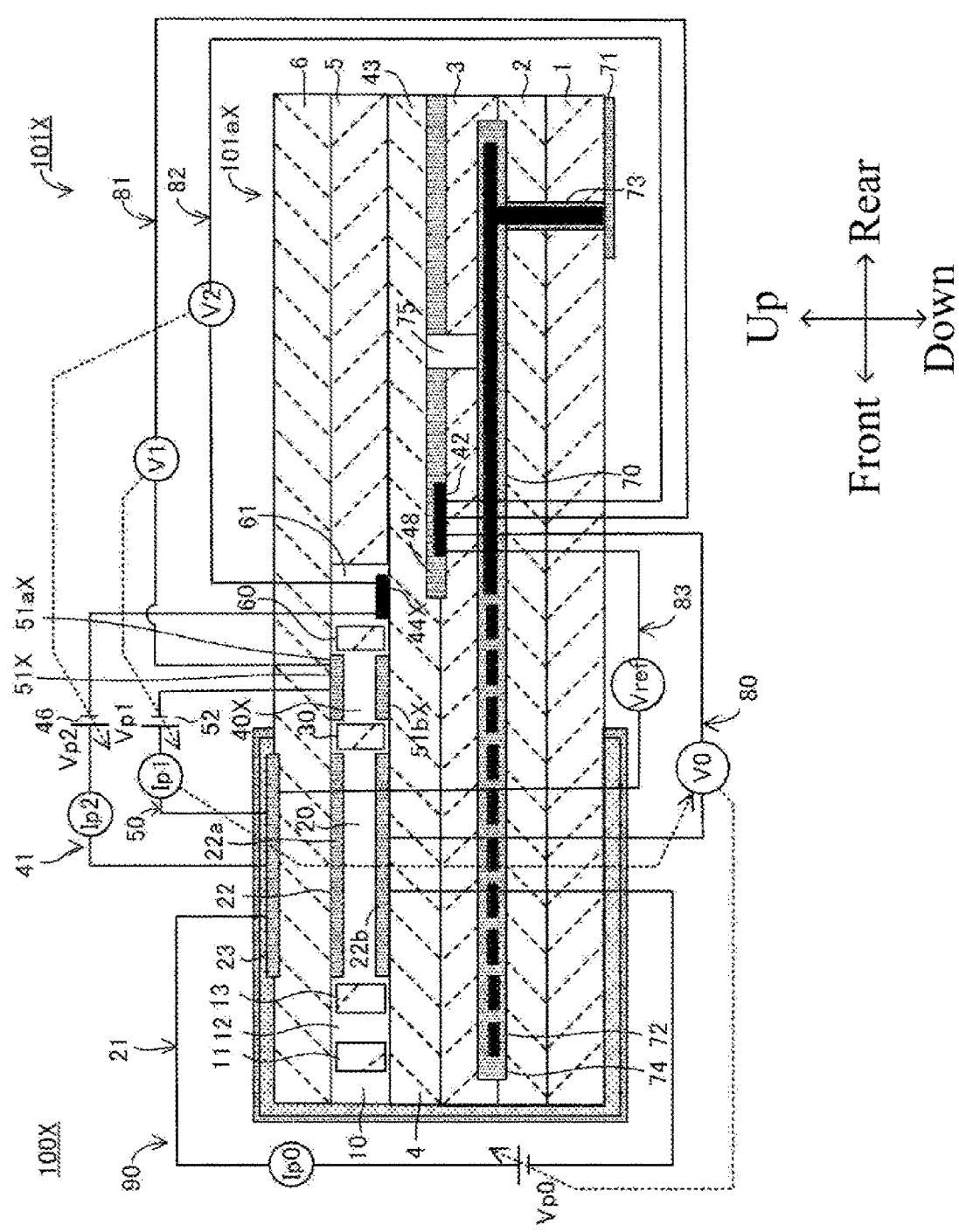
FIG. 5 is a cross-sectional schematic diagram schematically showing an example of a configuration of a gas sensor that includes a sensor element with a three-cavity structure.

FIG. 5 is a cross-sectional schematic view schematically showing an example of the configuration of a gas sensor 100X including a sensor element 101X with a three-cavity structure. It is also possible that, as shown in FIG. 5, the second internal cavity 40 (FIG. 1) is further divided by a fifth diffusion control unit 60 into two cavities, namely a second internal cavity 40X and a third internal cavity 61. In this case, an auxiliary pump electrode 51X may be arranged in the second internal cavity 40X, and a measurement electrode 44X may be arranged in the third internal cavity 61. In the case of applying a three-cavity structure, the fourth diffusion control unit 45 may be omitted.

5-2

Also, in the above embodiment, the upper face of the protective layer 90 has a surface roughness Ra of 8 μm or less and a surface waviness Wa of 6 μm or more, but some or all of the lower face, the left face, the right face, and the front face of the protective layer 90 may have a surface roughness Ra of 8 μm or less and a surface waviness Wa of 6 μm or more.

6. EXAMPLES, ETC

6-1. Examples and Comparative Example

First, a sensor element 101 serving as an example was manufactured by the method described below. Specifically, first, the element body 101*a* was manufactured, and then the sensor element 101 was manufactured by forming the protective layer 90 on the element body 101*a*.

First, a method for manufacturing the element body 101*a* will be described. Six unfired ceramic green sheets each containing an oxygen ion-conductive solid electrolyte such as zirconia as a ceramic component were prepared. Note that each of the ceramic green sheets was formed through tape casting of a mixture of zirconia particles to which 4 mol % of yttria serving as a stabilizer was added, an organic binder, and an organic solvent. A plurality of sheet holes for use in positioning during printing or stacking, necessary through-holes, and the like were formed through the green sheets.

Furthermore, a space for use as the gas flow passage was formed in advance through processing such as punching through a green sheet for use as the spacer layer 5. Then, pattern printing and drying for forming various patterns were performed on the ceramic green sheets respectively corresponding to the first substrate layer 1, the second substrate layer 2, the third substrate layer 3, the first solid electrolyte layer 4, the spacer layer 5, and the second solid electrolyte layer 6.

Specifically, the formed patterns were patterns of the above-described electrodes, lead wires connected to the electrodes, the air introduction layer 48, the heater unit 70, and the like. The pattern printing was performed by applying a pattern forming paste prepared according to properties required for the respective patterns that were to be formed, to green sheets using a known screen printing technique. The drying was also performed using a known drying means. When the pattern printing and the drying were ended, printing and drying of a bonding paste for stacking and bonding the green sheets corresponding to the respective layers were performed.

Then, the green sheets on which the bonding paste was formed were positioned using the sheet holes and stacked in a predetermined order, and subjected to pressure bonding in which the sheets were pressure-bonded by application of a predetermined temperature and pressure conditions, and thus one stack was formed. The thus obtained stack included a plurality of element bodies 101*a*. The stack was cut into portions each having the size of an element body 101*a*. Then, the cut stack was fired at a predetermined firing temperature, and thus an element body 101*a* was obtained.

Next, a method for forming the protective layer 90 on the element body 101*a* will be described. After firing the element body 101*a*, the protective layer 90 was formed by a dipping method performed using a slurry for the outer protective layer and a slurry for the inner protective layer to form the outer protective layer 91 and the inner protective layer 92. The slurry for the outer protective layer was prepared by dispersing a raw material powder (alumina) for the outer protective layer 91 and a pore-forming material in a solvent, for example. The slurry for the inner protective layer was also prepared in a similar manner, except that a powder for the inner protective layer 92 was used as the raw material powder.

First, at least part of the surface of the solid electrolyte layers (layers 1 to 6) of the element body 101*a* was coated by dipping using the inner protective layer slurry to form a film. Dipping was performed as follows. First, the front end face of the element body 101*a* was directed downward, and the element body 101*a* was immersed in the inner protective layer slurry perpendicularly to the surface. At this time, the region extending the distance L from the front end of the element body 101*a* was immersed in the inner protective layer slurry. Then, the element body 101*a* was moved rearward and slowly pulled up from the inner protective layer slurry. As a result, the region extending the distance L rearward from the front end of the element body 101*a* was coated with the film made of the inner protective layer slurry. After pulling up the element body 101*a*, the coating was allowed to dry. After drying, the outer protective layer slurry was used to form a coating by dipping and drying in a similar manner.

After the coatings of the outer protective layer slurry and the inner protective layer slurry were formed and dried as described above, the coatings were fired at a predetermined firing temperature. As a result, the coatings were sintered to form the protective layer 90 that includes the outer protective layer 91 and the inner protective layer 92, and the sensor element 101 was obtained. The resulting sensor element 101 was subjected to surface polishing as necessary.

Sensor elements 101 according to Examples 1 to 5 were obtained by such a method. In Example 1, the surface roughness Ra of the upper face of the protective layer 90 was 7.6 μm, and the surface waviness Wa of the upper face of the protective layer 90 was 6.2 μm. In Example 2, the surface roughness Ra of the upper face of the protective layer 90 was 7.1 μm, and the surface waviness Wa of the upper face of the protective layer 90 was 6.9 μm. In Example 3, the surface roughness Ra of the upper face of the protective layer 90 was 7.3 μm, and the surface waviness Wa of the upper face of the protective layer 90 was 9.4 μm. In Example 4, the surface roughness Ra of the upper face of the protective layer 90 was 7.7 μm, and the surface waviness Wa of the upper face of the protective layer 90 was 7.5 μm. In Example 5, the surface roughness Ra of the upper face of the protective layer 90 was 7.6 μm, and the surface waviness Wa of the upper face of the protective layer 90 was 8.6 μm.

Note that the surface roughness Ra and the surface waviness Wa were each measured in accordance with JIS B0633:2001.

Figure 6:
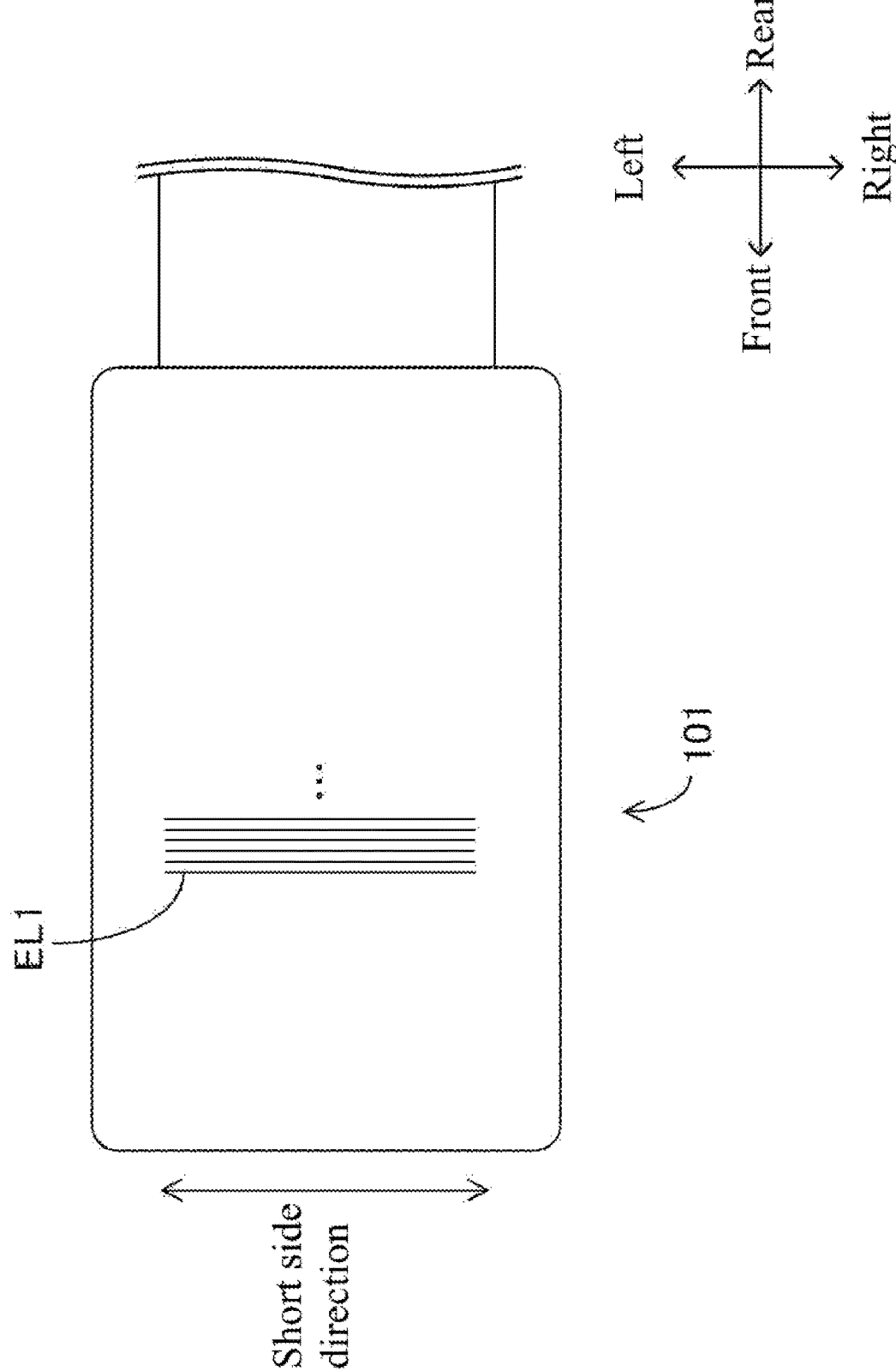
FIG. 6 is a diagram illustrating a method for measuring a surface roughness Ra and a surface waviness Wa.

FIG. 6 is a diagram illustrating a method for measuring the surface roughness Ra and the surface waviness Wa. As shown in FIG. 6, a cutoff value specified in the JIS standard was set, and line roughness was measured for ten lines EL1 in the short side direction of the sensor element 101. The average values of measurement results for the ten lines EL1 were taken as the surface roughness Ra and the surface waviness Wa. Note that VR-3000 manufactured by Keyence Corporation was used for the measurement of line roughness.

Moreover, a sensor element corresponding to Comparative Example 1 was also manufactured by a method similar to that described above. The upper face of the protective layer had a different surface roughness Ra and surface waviness Wa from Examples 1 to 5. In Comparative Example 1, the surface roughness Ra of the upper face of the protective layer was 8.6 μm, and the surface waviness Wa of the upper face of the protective layer was 5.1 μm.

6-2. Water Resistance Test

Figure 7:
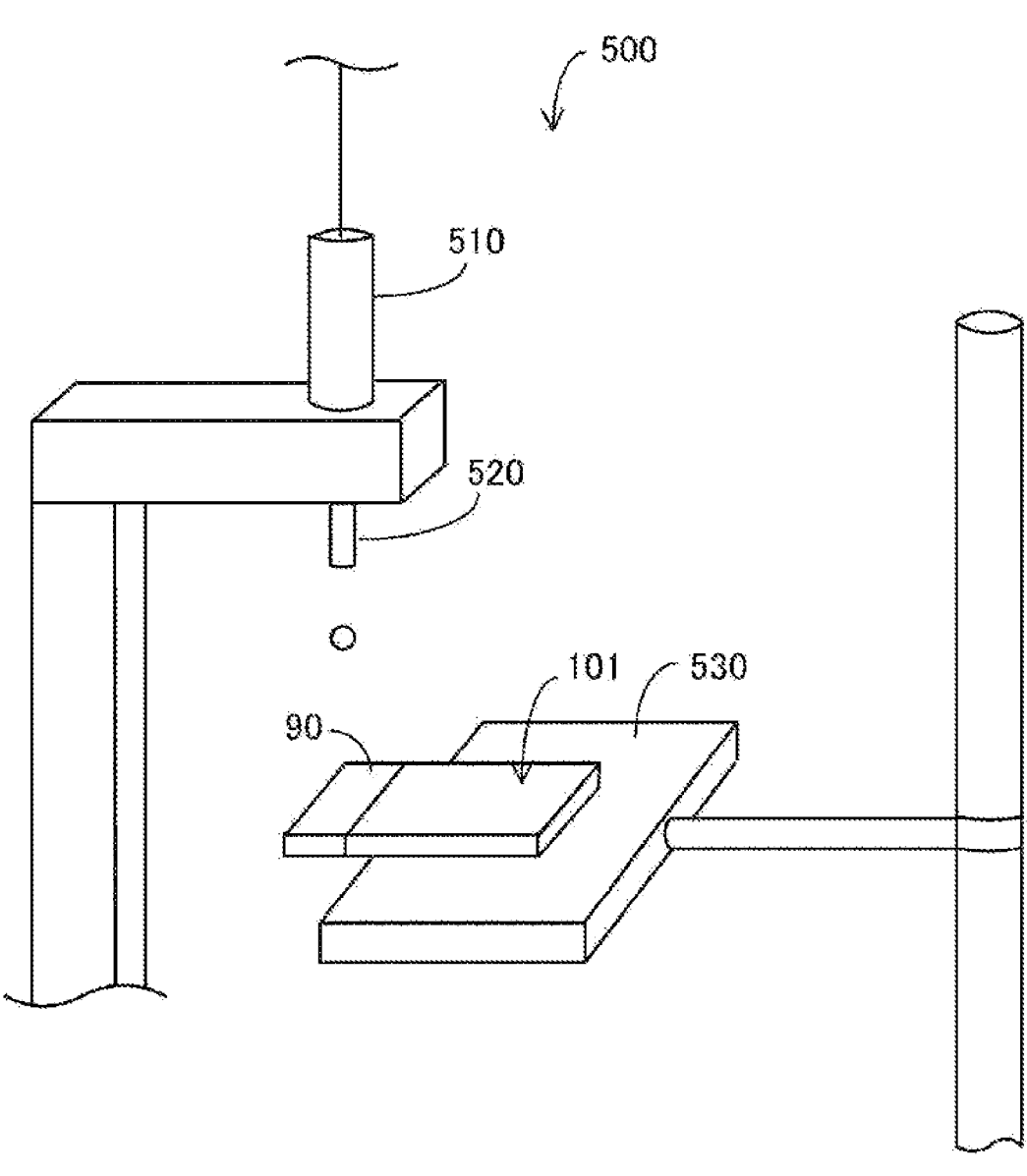
FIG. 7 is a diagram schematically showing a device used in a water resistance test.

FIG. 7 is a diagram schematically showing a device used in a water resistance test. As shown in FIG. 7, a dispenser 500 includes a head 510 and a nozzle 520. The sensor element 101 is held by an element clamp 530.

In the water resistance test, a liquid is supplied from a liquid reservoir to the nozzle 520, which has an inner diameter of 3 mm or less. Specifically, the liquid is supplied to the nozzle 520 by applying pressure that is 1 to 10 kPa higher than the atmospheric pressure. Using dripping, droplets of a desired amount set in the range of 3 to 70 μL are dropped from the tip of the nozzle 520 onto the sensor element 101 (the protective layer 90). The influence of dropping of the droplet on the sensor element 101 is evaluated.

More specifically, droplets are dropped on the upper face of the protective layer 90 of the sensor element 101 by opening the nozzle for a first predetermined time. If no abnormality occurs in the sensor element 101, droplets are dropped onto a predetermined position of the sensor element 101 for a second predetermined time longer than the first predetermined time. This operation is repeated until an abnormality occurs in the sensor element 101, or until all predetermined patterns of predetermined time are completed.

If a crack forms in the sensor element 101 due to the dropping of the droplets, oxygen enters the first internal cavity 20, and Ip0 (FIG. 1) rises sharply. Whether or not a crack has formed in the sensor element 101 is determined based on the presence or absence of a sharp increase in Ip0. Five samples were used in each of Examples 1 to 5 and Comparative Example 1. The water resistance test was conducted by such a method.

6-3. Test Results

The test results are summarized in Table 1 below.

TABLE 1

|  | Surface roughness Ra (μm) | Surface waviness Wa (μm) | Water resistance ratio relative to Example 1 |
|---|---|---|---|
| Ex. 1 | 7.6 | 6.2 | 1 |
| Ex. 2 | 7.1 | 6.9 | 1.9 |
| Ex. 3 | 7.3 | 9.4 | 1.7 |
| Ex. 4 | 7.7 | 7.5 | 1.3 |
| Ex. 5 | 7.6 | 8.6 | 2 |
| Comp. 1 | 8.6 | 5.1 | 0.5 |

It can be said that the higher the water resistance value is, the higher the level of water resistance is. As shown in Table 1, compared with a value of 1 for the water resistance of Example 1 (reference), the water resistance of each of Examples 2 to 5 exceeded 1. On the other hand, the water resistance of Comparative Example 1 was below 1.

LIST OF REFERENCE NUMERALS

1 First substrate layer
2 Second substrate layer
3 Third substrate layer
4 First solid electrolyte layer
5 Spacer layer
6 Second solid electrolyte layer
10 Gas introduction opening
11 First diffusion control unit
12 Buffer space
13 Second diffusion control unit
20 First internal cavity
21 Main pump cell
22 Internal pump electrode
22a, 51a, 51aX Ceiling electrode portion
22b, 51b, 51bX Bottom electrode portion
23 External pump electrode
30 Third diffusion control unit
40, 40X Second internal cavity
41 Measurement pump cell
42 Reference electrode
43 Reference gas introduction space
44, 44X Measurement electrode
45 Fourth diffusion control unit
46, 52 Variable power source
48 Air introduction layer
50 Auxiliary pump cell
51, 51X Auxiliary pump electrode
60 Fifth diffusion control unit
61 Third internal cavity
70 Heater unit
71 Heater electrode
72 Heater
73 Through-hole
74 Heater insulating layer
75 Pressure dispersing hole
80 Main pump-controlling oxygen partial pressure detection sensor cell
81 Auxiliary pump-controlling oxygen partial pressure detection sensor cell
82 Measurement pump-controlling oxygen partial pressure detection sensor cell
83 Sensor cell

90 Protective layer
91, 91a-91e Outer protective layer
92, 92a-92e Inner protective layer
100 Gas sensor
101 Sensor element
101a Element body
500 Dispenser
510 Head
520 Nozzle
530 Element clamp
P1, P2 Position
Po1, Po2 Porosity
Th1, Th2 Thickness
Wt1 Water droplet
EL1 Line

The invention claimed is:

1. A sensor element for use in measurement of a concentration of a predetermined gas component in a measurement target gas, the sensor element comprising:

a plate-shaped element body including a solid electrolyte layer having oxygen ion conductivity and a heater configured to heat the solid electrolyte layer; and a protective layer formed on at least one face of the element body, wherein a surface of the protective layer has a surface roughness Ra of 8 μm or less and a surface waviness Wa of 6 μm or more.

2. The sensor element according to claim 1, wherein the element body has a long side and a short side in plan view, and the surface roughness Ra and the surface waviness Wa are each obtained from a profile curve of the protective layer in a short side direction.

3. The sensor element according to claim 2, wherein a position corresponding to a central portion of the protective layer in the short side direction of the element body is raised higher than positions corresponding to two end portions of the protective layer in the short side direction.

4. The sensor element according to claim 2, wherein the protective layer includes an inner protective layer and an outer protective layer located outward of the inner protective layer, the inner protective layer and the outer protective layer are each porous, an average pore diameter of the outer protective layer is smaller than an average pore diameter of the inner protective layer, and a porosity of the inner protective layer is 40% or more and 60% or less.

5. The sensor element according to claim 1, wherein a position corresponding to a central portion of the protective layer in a short side direction of the element body is raised higher than positions corresponding to two end portions of the protective layer in the short side direction.

6. The sensor element according to claim 5, wherein the protective layer includes an inner protective layer and an outer protective layer located outward of the inner protective layer, the inner protective layer and the outer protective layer are each porous, an average pore diameter of the outer protective layer is smaller than an average pore diameter of the inner protective layer, and a porosity of the inner protective layer is 40% or more and 60% or less.

7. The sensor element according to claim 1, wherein the protective layer includes an inner protective layer and an outer protective layer located outward of the inner protective layer, the inner protective layer and the outer protective layer are each porous, an average pore diameter of the outer protective layer is smaller than an average pore diameter of the inner protective layer, and a porosity of the inner protective layer is 40% or more and 60% or less.

8. The sensor element according to claim 7, wherein a film thickness of the inner protective layer is 170 μm or more and 900 μm or less.

9. The sensor element according to claim 8, wherein a porosity of the outer protective layer is 15% or more and 50% or less.

10. The sensor element according to claim 8, wherein a film thickness of the outer protective layer is 30 μm or more and 300 μm or less.

11. The sensor element according to claim 7, wherein a porosity of the outer protective layer is 15% or more and 50% or less.

12. The sensor element according to claim 11, wherein a film thickness of the outer protective layer is 30 μm or more and 300 μm or less.

13. The sensor element according to claim 7, wherein a film thickness of the outer protective layer is 30 μm or more and 300 μm or less.

* * * * *